April 16, 1929.  J. R. MORGART  1,709,680
MONOGRAM IDENTIFICATION FOR MOTOR VEHICLES
Filed May 5, 1927
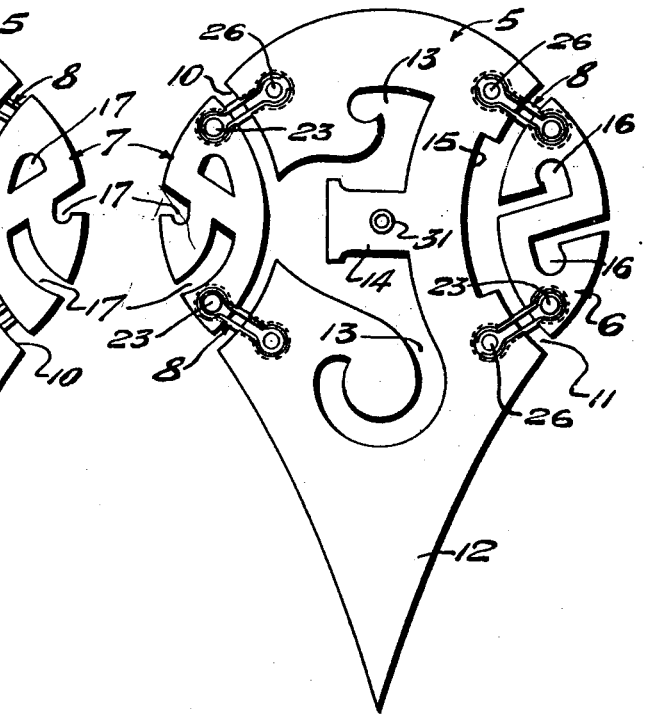
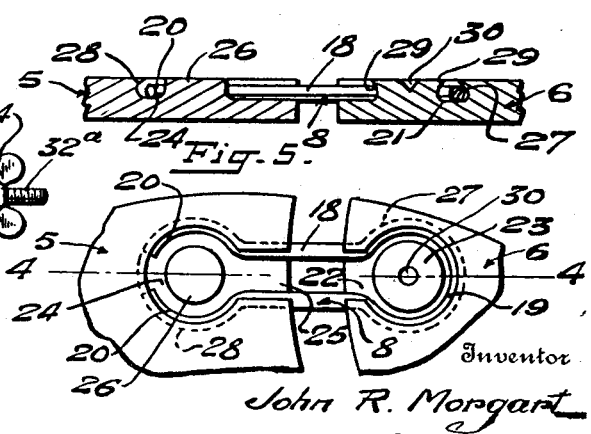
Inventor
John R. Morgart
By
Attorney Patented Apr. 16, 1929.

1,709,680

UNITED STATES PATENT OFFICE.

JOHN R. MORGART, OF YORK, PENNSYLVANIA.

MONOGRAM IDENTIFICATION FOR MOTOR VEHICLES.

Application filed May 5, 1927. Serial No. 189,077.

This invention relates to monogram identification means for an automobile.

The invention consists essentially of a main initial component of a preferred ornamental contour and supplemental and similarly shaped initial components separably associated with the main component by a novel form of fastening that remains intact with the supplemental components and readily attachable and detachable from opposite portions of the main component.

The invention further consists of the details of construction and arrangement of the several parts which will be hereinafter particularly described and claimed.

The main objects of the invention are to provide an identifying monogram structure especially adapted for use on an automobile comprising a plurality of letter components having a standardized formation and adapted to be carried in stock for ready assemblage without the use of permanent fastening means, such as solder or the like, and also capable of the desired combination simply by pressure exerted on a fastening means that may be easily and quickly manually operated to associate and dissociate the several components of the monogram, and which may be detachably applied to an automobile in such manner as to avoid marring any part of the automobile.

In the drawing:—

Figure 1 is a front elevation of a monogram comprising assembled components embodying the features of the invention.

Figure 2 is a rear elevation of the same.

Figure 3 is a plan view of the monogram with a preferred means for separably applying the same.

Figure 4 is a section on the line 4—4, Figure 5.

Figure 5 is an enlarged plan view of rear portions of two of the components and novel fastening means therefor.

The numeral 5 designates the main component, and 6 and 7 the supplemental components which are associated with the main component by fastening means generally designated by 8. The main component 5 is preferably formed with an upper segmental circular body 9 having opposite arcuate recesses 10 and 11 and a converging pendant 12. Each of the supplemental components have a substantially elliptical contour and are fitted into the recesses 10 and 11, as shown by Figures 1 and 2, and secured in place by the fastenings 8. When the supplemental components 6 and 7 are applied and attached to the main component 5, the upper part of the monogram is given a circular effect, as one preferred configuration, with the pendant 12 extending therefrom. In the present instance the main component 5 is cut at 13 to represent the letter "E" and to form the central stem 14 of said letter, and also has an entrant slot 15 which assists in the delineation of the main upright member of this letter, as illustrated. The supplemental components 5 and 7 respectively are shown as cut or formed, as at 16 and 17, to represent the letters "S" and "R", and when these supplemental components are associated with the main component the monogram is symmetrically completed and is given the form heretofore explained. It will be understood, of course, that the main component may have some other letter character delineated therein and that the components 6 and 7 may likewise be varied as to their letter characters and still have the same general contour, so that a complete symmetrical monogram structure will be provided. It is proposed to form the components 5, 6 and 7 of a suitable thickness of metal or other substance adapted for the purpose, and it will be understood that in the formation of the letter characters the invention is not confined to the exact configurations of the cuts or slots which are utilized to produce the specific letter characters shown by the drawings.

In all instances, however, the main component 5 will carry the essential initial letter configuration of whatever nature desired and the supplemental components 6 and 7 will carry the remaining letter characters or initials of the name which the complete monogram is supposed to represent, and represent the initials of the name of the owner of the automobile or motor vehicle to which the improved monogram is adapted to be applied.

It is the purpose of the present invention to avoid the utilization of permanent fastening means between the supplemental components 6 and 7 of the main component 5. Heretofore it has been the custom to produce monograms of this character which comprise a back plate and to slot the same and apply thereto letter characters having spurs to fit the said slots, or, to have a series of letters permanently formed of sheet metal and bent for association in interlocking monogram form and secured against movement by soldering, riveting, or the like, so as to produce an automobile monogram or name ornament with a plurality of interwoven characters permanently fastened together at their points of intersection. According to the present invention the fastening means 8 is permanently secured preferably to each of the supplemental components 6 and 7 and separably attached to the main component 5. In the present instance each fastening device comprises a pair of intermediate connectors 18 having at one end a complete loop or circularly shaped head 19, and at the opposite end a pair of semi-circular jaws 20, this fastening device being preferably made of spring wire or like material and readily compressible so that the jaws 20 may be drawn together and then be permitted to expand when associating or dissociating the several fastenings carried by the supplemental components with relation to the main component. Each supplemental component is formed with a circular recess or seat 21 in the back side thereof adjacent its upper and lower portions, each recess or seat being curved or of circular contour and communicating with an outlet groove 22 extending through a side edge of the supplemental component. The substantially circular recess or seat 21 has a central boss or stud 23 projecting therefrom, and similar recesses or seats 24 are formed in the back of the main component 5 adjacent each of its side edges said recesses or seats each having an outlet groove 25 extending through a side edge of such component. Each recess or seat 24 also has a central boss or stud 26 projecting therefrom, as clearly shown in detail by Figure 5. The walls of each recess or seat 21 and groove 22 are projected or swaged inwardly as at 27, and the same formation of wall 28 is present in each recess or seat 24, so that the substantially circular head 19 at one end of each fastening and portions of the intermediate connectors, and the jaws 20 at the opposite terminal of the fastening may expand under the walls 27 and 28, as clearly indicated in dotted lines in Figure 5. After a fastening has been applied, that is to say, after the head 19 is seated in a recess or seat 21 of one of the components the boss or stud 23 will be preferably swaged outwardly, as at 29, by means of a suitable swaging tool or punch applied to the said boss or stud, as indicated by the V-shaped recess 30 in Figure 4, and by this means the head 19 of the fastening 8 is permanently secured to the supplemental component, and retained in place by opposite overhanging walls. The bosses or studs 26 which project from the center of the recesses or seats 24 are not swaged or struck outwardly as just explained in connection with the boss or head 23, in order that the jaws 20 may be drawn together within the recess or seat 24 to clear the overhanging portions of the walls 28 so as to permit the detachment of said jaws from the main component. This is one preferred form of fastening, and may be easily operated by manual pressure which may be applied through the medium of a suitable tool, for instance a pair of pliers, or by manual engagement or contact alone and makes it possible to readily connect and disconnect the supplemental components and the main component. Preferably there will be two of the fastening devices 8 associated with each supplemental component 6 and 7 and applied to the upper and lower extremities of said components, and the main component 5 will be provided with upper and lower recesses or seats 24 and studs 26 and outlet grooves 25 at opposite portions to receive the jaws 20 and parts of the connectors 18, the said seats and studs together with the outlet grooves being located on the rear sides of the components, and the fastenings preferably will be disposed at divergent angles, as clearly shown by Figure 2, the only portions of the fastening devices exposed at the front being the parts extending between the inner edges of the supplemental components and the outer edges of the recesses 10. By this means the fastenings, except the parts thereof which bridge the spaces between the components, will be hidden from the view and will not interfere with the pleasing configuration or symmetry of the front side of the monogram.

It is proposed to removably apply the improved monogram to a part of an automobile or motor vehicle and preferably to the radiator, and for this purpose at the center of the rear side of the body 9 (in the present instance on the central stem 14 of the initial letter delineated in the component 5) is a screw socket 31 which is adapted to receive the forward screw threaded extremity of a rod 32 having a rear screw threaded extremity $32^a$ on which is mounted a washer or clamp disc 33 adapted to be engaged by a wing-nut 34, as shown by Figure 3. The washer 33 and nut 34 are removed from the rod 32 and the latter inserted through an interstice of the radiator and the socket 31 is of such dimensions that it may be as desired likewise pushed into the said interstice. The washer 33 and nut 34 are then applied to the rod and caused to bear tightly against the inner side of the automobile radiator. This means of detachably applying the improved monogram to the radiator under the hood will materially defeat an attempt to nefariously detach the monogram, and this applying means will also positively hold the monogram against displacement from the radiator. The fastenings 8 will also prevent rattling of the components 5, 6 and 7 and especially the components 6 and 7 relatively to the component 5, and as a consequence no objectionable features will be present in the use and application of the improved monogram.

It is proposed to embellish the improved monogram with any suitable design, and to plate the same, or, adopt any other pleasing configuration, and it will be understood that the slots 13, 16 and 17 formed in the components to delineate the letters may be varied at will and in accordance with the formation of letter characters comprised in the improved monogram. The general contour of the main and supplemental components will be preserved, so that when the components are associated, as shown by Figure 1, the improved monogram will have the conventional contour of a pear. However, while the contours shown are preferred, it will be understood that they may be modified without departing from the essential features of the invention. A compactness of arrangement of the letter characters will at all times be preserved and the general design as shown will be preferably effected.

It is also obvious that changes in the proportions and minor details of construction of the several parts may be adopted without departing from the spirit of the invention or the scope of the appended claims.

What is claimed as new is:—

1. A monogram ornament of the class specified for application to a motor vehicle, comprising a main component having a letter character delineated therein and with seats and bosses formed on its rear side adjacent its upper and lower portions and also formed with recesses in opposite side edges, supplemental components having initial letters delineated therein and also provided on their rear sides with seats and bosses, and expanding and compressible fastening devices permanently secured in the seats and with relation to the bosses of the supplemental components and detachably engaging the seats and bosses of the main component to permit the supplemental components to be applied and detached, whereby the monogram may be modified to embody different letter characters with relation to the letter character of the main component.

2. A monogram ornament comprising a main letter component and a supplemental letter component, fastening engaging means carried by the rear side of one of said components adjacent one edge of the latter, and fastenings extending from one edge of the other component, and engageable with the fastening engaging means of said first named component, each of said fastenings comprising a pair of arms movable away from and toward one another for engagement with and disengagement from said fastening engaging means.

3. A monogram ornament, comprising a pair of letter components, one of said components having in its rear side a plurality of substantially circular grooves of which one wall is undercut, said component also having grooves extending radially from said circular grooves to one edge of said component, and fastening devices extending from one edge of the other component, each of said fastening devices comprising a pair of substantially straight arms having oppositely curved extremities, the straight portions of said arms being adapted to seat in the radial grooves and said curved extremities being adapted to seat in the undercut portions of the circuit grooves of said first-named component.

4. A monogram ornament, comprising a main letter component having substantially circular recesses formed in its rear side adjacent each of a pair of its opposite edges, each of said recesses having its wall undercut, a pair of supplemental letter components for attachment, respectively, to said opposite edges of said main component, and a plurality of fastening devices extending from an edge of each of said supplemental components, each of said fastening devices comprising a pair of relatively movable members shaped to fit within the undercut portion of one of the recesses of the main component.

5. A monogram ornament, comprising a main letter component and a supplemental letter component, one of said components having depressions with undercut walls formed in its rear side adjacent one of its edges, and also having grooves in its rear side extending, respectively, from said depressions to said edge of said component, and a plurality of fastening members extending from one edge of the other component, each of said fastening members comprising a pair of arms adapted to seat in the grooves and depressions of said first named component and tending to spread apart against the undercut walls of said depressions.

6. A monogram ornament according to claim 5, wherein a boss is mounted within each of the depressions of one component in spaced relation to the wall of such depression and wherein the arms of the fastening members carried by the other component are shaped to fit in the spaces between said bosses and the walls of said depressions.

7. A monogram ornament according to claim 5, wherein the depressions of one component are substantially circular and wherein the arms of the fastening members carried by the other component are formed of spring material and are shaped to engage diametrically opposite portions of the walls of said depressions.

In testimony whereof I have hereunto set my hand.

JOHN R. MORGART.